Patented Oct. 20, 1953

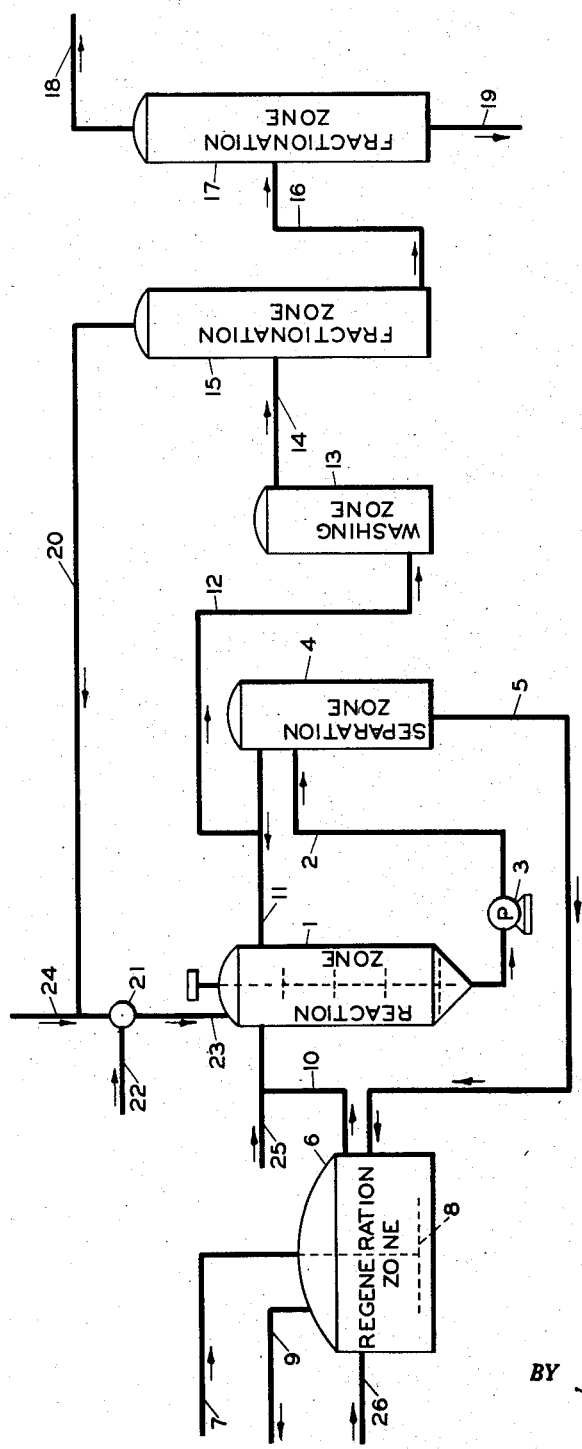

2,656,392

UNITED STATES PATENT OFFICE 2,656,392

PROCESS FOR THE MANUFACTURE OF DIALKYL SULFIDES

Walter A. Schulze and Willie W. Crouch, Bartlesville, Okla., assignors to Phillips Petroleum Company, a corporation of Delaware Application December 13, 1948, Serial No. 65,008

10 Claims. (Cl. 260—608)

This invention relates to dialkyl disulfides. In one of its more specific aspects, it relates to the manufacture of dialkyl disulfides by the oxidation of low molecular weight mercaptans in an aromatic hydrocarbon solvent medium.

In the past, small concentrations of mercaptans, such as those naturally occurring in petroleum oils, have been oxidized to disulfides and polysulfides by various methods. For example, in the manufacture of gasoline, the oxidation of contaminating mercaptans to disulfides has long been practiced for the purpose of eliminating their obnoxious odor. However, in such instances, the concentration of mercaptans is very, very small, usually about 0.01 to 0.03 per cent, and the qantity of disulfides produced by their oxidation is even smaller. Obviously such operations do not afford a commercial source of disulfides since recovery of these exceedingly small amounts is uneconomical and impractical due to the enormous throughput necessary.

An obvious method for the production of disulfides would appear to lie in fortifying the gasoline with a sufficient amount of the desired mercaptan to provide a concentration of at least 5 to 10 per cent, or more desirably 20 to 40 per cent, and oxidizing the said mercaptan content to disulfide, thus providing sufficiently great disulfide concentration that recovery could be carried out economically. However, attempts to operate in this manner, particularly with mercaptans of low molecular weight or those of tertiary configuration, encounter numerous difficulties.

The usual method for the oxidation of mercaptans to disulfides in gasoline, often referred to as "sweetening" or "copper sweetening" the gasoline, comprises treatment with an aqueous solution of cupric copper ions. When operating in this manner, the reaction apparently proceeds in two steps which may be represented by the following theoretical equations:

(1) $4RSH + 2Cu^{++} \rightarrow RSSR + 2RSCu + 4H^+$
(2) $2RSCu + 2Cu^{++} \rightarrow RSSR + 4Cu^+$ It will be observed that in the first reaction, i. e., according to Equation 1, half of the mercaptan is converted to cuprous mercaptide which is then transformed to disulfide in the second reaction, Equation 2, by further action of cupric ions. For Reaction 2 to proceed satisfactorily, it is necessary for the cuprous mercaptide to remain dissolved in the solution in order that adequate contacting with the oxidizing agent may occur. In fact, for the reaction to proceed, it is required that a finite concentration of cuprous mercaptide be built up and maintained in the solution. However, when attempting to operate with higher concentrations of mercaptans of low molecular weight or mercaptans of tertiary configuration, in gasoline the cuprous mercaptides formed being but slightly soluble therein, precipitate from the system. Thus, Reaction 2 either does not take place or proceeds at a greatly reduced rate. Furthermore, the reduction in the concentration of copper and attendant reduction in pH of the system caused by the precipitation of the cuprous mercaptides effects a serious reduction in oxidation potential, even though provision is made for regeneration of the soluble cuprous copper to cupric copper. As the oxidation potential is reduced, Reaction 1 also proceeds at a correspondingly reduced rate. Thus, such a procedure is generally unsatisfactory for disulfide manufacture.

An object of this invention is to provide a process whereby mercaptans may be oxidized to dialkyl disulfides.

Another object is to provide an economical and rapid process for the production of dialkyl disulfides.

Another object is to provide a continuous process for the oxidation of mercaptans to dialkyl disulfides.

Still another object is to provide a process for the manufacture of dialkyl disulfides by the oxidation of mercaptans in an aromatic hydrocarbon medium.

Another object is to provide a process for the manufacture of dialkyl disulfides by the oxidation of low molecular weight mercaptans, the cuprous mercaptides formed from said mercaptans, which are intermediate products, being insoluble in aliphatic hydrocarbons.

Another object is to provide a process for the manufacture of dialkyl disulfides by the oxidation of low molecular weight mercaptans in an aromatic medium.

Another object is to provide a process for the manufacture of dialkyl disulfides wherein a high oxidation potential is maintained.

Another object is to provide a process for manufacture of dialkyl disulfides wherein substantially all of the cuprous mercaptide intermediate product is maintained in solution.

Another object of this invention is to provide a process for the manufacture of dialkyl disulfides wherein the reaction mixture contains a high percentage of cuprous mercaptide.

Further objects and advantages of our invention will be apparent to one skilled in the art from the accompanying disclosure and discussion.

We have discovered a process whereby mercaptans, particularly low molecular weight mercaptans whose corresponding cuprous mercaptides are insoluble in aliphatic hydrocarbons, may be oxidized to the corresponding dialkyl disulfides in aromatic hydrocarbon media by the action of an aqueous solution of cupric copper ions thereby eliminating or substantially reducing the aforementioned difficulties. In accordance with one method for the practice of our invention, a mercaptan, which may be primary, secondary, or tertiary and which may contain as many as 12 carbon atoms per molecule, but preferably not more than 10 carbon atoms per molecule, may be oxidized to the corresponding dialkyl disulfide in a continuous process with a high degree of conversion, often substantially quantitative. By our process, the oxidation is carried out in a medium comprising an aromatic hydrocarbon solvent of the single ring type such as benzene, or alkyl substituted benzenes such as toluene, cumene, xylene, ethylbenzene, and the like, containing at least 80 per cent aromatics in which cuprous mercaptide in the amounts produced is soluble. When operating in this manner, a stream of mercaptan dissolved in the solvent is fed to a reactor wherein it is contacted with an aqueous solution of cupric copper ions under conditions for substantially complete oxidation of the mercaptan to dialkyl disulfide. A suitable ratio of the mercaptan to the aromatic solvent in the feed stream to the reactor is 1:2 to 1:5, however, under many circumstances it may be preferable to use ratios of 1:3 to 1:4. Desirable ratios of aqueous cupric copper solution to mercaptan-aromatic hydrocarbon solution in the reactor are 1:1 to 10:1, however, preferred ratios are in the range of 6:1 to 8:1. A portion of the reaction mixture, i. e., the material taken from the reactor containing dialkyl disulfide, aromatic, and aqueous cupric copper, is continuously circulated from the reactor through a separating chamber from which the aqueous phase is continuously removed and subjected to treatment for regeneration of the cupric ions, for example, by blowing with an oxygen-containing gas, after which the solution containing the regenerated cupric ions is returned to the reactor. The organic phase containing dialkyl disulfide and aromatic hydrocarbon, which is removed along with the aqueous phase and separated therefrom, is divided into a major and minor portion, the major portion being recycled to the reaction zone and the minor portion being discharged to a fractional distillation system where the solvent is removed for recycling and the dialkyl disulfide removed as product. The minor portion of the organic phase comprising the product take off, and the mercaptan-aromatic solution feed to the reactor will be of substantially equal volume when a steady state has been established. Suitable conditions within the reactor for carrying out this reaction are temperatures in the range of 50 to 200° F. and preferably temperatures in the range of 70 to 140° F. However, when operating with particularly refractory mercaptans, it may be desirable to maintain a somewhat higher temperature than that given as a preferred range, say between 140 and 175° F. Pressure does not ordinarily affect the reaction to any great extent and one which will maintain the liquid phase may be readily selected by one skilled in the art.

By so operating our process several important advantages are gained. One such advantage lies in the use of the aromatic solvent medium in which the oxidation is carried out, said solvent medium being of such a nature that the cuprous mercaptide formed as an intermediate in the reaction, is maintained in solution. Thus, the cupric ions are constantly in contact with the dissolved mercaptide and its conversion to dialkyl disulfide is thus rendered substantially complete.

Our process also provides for the maintenance of a high oxidation potential, and a substantially constant concentration of copper in the system. Thus, by continuous circulation of the aqueous copper solution to the regeneration system, the concentration of cupric ions is maintained at an optimum level and the pH of the system is correspondingly upheld. If the cuprous mercaptide was allowed to precipitate, the acid content of the reaction mixture would increase and the pH would go down. Thus, since a high oxidation potential is dependent on a high pH, the reaction would be brought to a standstill. The requisite high potential is further insured by the high internal recycle of organic constituents. The rate of mercaptan feed may be regulated in a manner such that substantially complete oxidation is effected and at the same time separation and regneration of the copper solution may be carried out at a much higher rate than the throughput of mercaptan. For example, 50 to 200 volumes of copper solution may be removed and regenerated for each volume of mercaptan fed and dialkyl disulfide solution removed.

The oxidizing copper solution used in our process comprises an aqueous solution of cupric copper in the presence of a chloride ion concentration equivalent to that of a 10 to 20 mol per cent sodium chloride solution. A cupric copper concentration may vary from about 3 to about 14 mol per cent although intermediate concentrations of from 5 to 10 mol per cent are ordinarily preferred.

The rate of circulation of the above copper solution to regeneration will vary, depending upon the rate of regeneration, mercaptan feed, and other features. We have found that in many instances a circulation of about 50 to 200 volumes of copper solution to regeneration for each volume of mercaptan solution fed to the reaction zone gives satisfactory results. However, variations in concentration of mercaptan in the feed stream will influence this rate considerably. In any case, the rate of circulation and regeneration should be such that the oxidation potential within the reaction zone, measured against saturated calomel, is maintained between about 375 and 500 millivolts.

A further understanding of some of the many aspects of our invention may be had by referring to the attached drawing, which is a schematic flow diagram, in combination with the following description. Various additional valves, pumps, and other conventional equipment necessary for the practice of this invention will be familiar to one skilled in the art and have been omitted from the drawing for the sake of clarity. The description of the drawing provides one method of operating our process, however, it is understood that while this is representative in general of our process, various minor changes may be made in adapting it to the various conditions within the scope of the invention.

Refer now to the drawing. A solution of tertiary octyl mercaptan in toluene is agitated with a major portion, i. e., a portion comprising more than one half of the total reaction mixture, of an aqueous solution of cupric copper ions in reaction zone 1. A stream of this mixture is continuously removed via line 2 and pump 3 to separation zone 4 where the aqueous copper solution separates by gravity and is conveyed through line 5 to regenerating zone 6. In this zone, air from line 7 is blown through the solution to oxidize the reduced copper and to regenerate the cupric ions. We have generally preferred to introduce the air into the copper solution through a porous tube or disc 8 whereby more adequate contacting is effected. However, any suitable method for thoroughly diffusing the air through the copper solution and effecting good regeneration may be used. A suitable regeneration temperature may be room temperature, however, this is not critical. The regeneration zone 6 is vented through line 9 for removal of the regeneration gas. Vapor recovery means, not shown, may be utilized in conjunction with line 9 to prevent loss of solvent which may have been entrained in the copper solution. After regeneration, the cupric solution is returned to reaction zone 1 via lines 10 and 25. A major portion of the organic phase in the separation zone is constantly returned to the reaction zone through line 11. A minor portion of this phase which is the product stream is passed via lines 11 and 12 to washing zone 13 where entrained copper is removed by caustic treatment. The product stream is removed from washing zone 13 via line 14 and is passed to fractionation zone 15 for removal of toluene overhead, and from thence via line 16 to fractional distillation zone 17 for final distillation, preferably under reduced pressure. The product, ditertiary octyl disulfide is removed from fractional distillation zone 17 via line 18. The toluene recovered in zone 15 is conveyed through recycle lines 20 and 24 to mixing zone 21 where it is admixed with tertiary octyl mercaptan introduced through line 22; the admixture then being charged to reaction zone 1 via line 23.

While the solvent and copper solutions employed in our process are not consumed and efficient recycling makes possible continuous operation for considerable periods of time without additions of these materials, provision is made for solvent makeup through line 24 and for addition of cupric copper solution through line 25 to replace mechanical losses. Also from time to time, it may be desirable to adjust the pH of the system by addition of small amounts of hydrochloric acid, either by way of makeup line 25 or at the regeneration zone 6, via line 26, to replace vaporization losses.

While the foregoing disclosure has related particularly to a continuously operating process, it is likewise applicable to batchwise operation; also to the use of two consecutive reactors operated in series for the oxidation of very refractory mercaptans, and such embodiments are within the scope of our invention.

Advantages of this invention are illustrated by the following examples. The reactants and their proportions and other specific ingredients are presented as being typical and should not be construed to limit the invention unduly.

*Example I*

Ditertiary octyl disulfide was prepared by the oxidation of tertiary octyl mercaptan in a manner similar to that shown in the accompanying diagram. The solvent employed was toluene, and was used in a ratio of 3 parts of toluene to 1 part of mercaptan. The copper solution was prepared by dissolving 14.8 wt. per cent cupric sulfate pentahydrate and 13.5 wt. per cent sodium chloride in water. The volume ratio of copper solution to mercaptan-toluene solution in the reactor was maintained at 4.5:1. The charge rate of the mercaptan solution feed was 500 volumes per hour while the rate at which the copper solution was circulated to the regeneration unit was 12,000 volumes per hour. The product take-off rate was substantially the same as the mercaptan solution input; 500 volumes per hour. The run was carried out continuously for a period of 4 hours.

The product stream was washed with caustic, stripped of toluene solvent to be recycled, and fractionally distilled under reduced pressure. A yield of 98 per cent based on mercaptan feed was obtained. The ditertiary octyl disulfide was clear, pale yellow in color, and sweet to the doctor test. Other properties were:

Density, gm./cc. at 28° C_____ 0.9153
Refractive index, $n_D^{20}$_____ 1.4998
Total sulfur, weight per cent_____ 21.6
Mercaptan sulfur, weight per cent_____ 0.0

Tests were made on the copper solution at the beginning of this run and each hour thereafter to determine oxidation potential and pH. Samples were removed from the recycle stream between the regenerating unit and the reactor. Results of these tests were as follows:

| Time (hrs.) | Potential mv. | pH |
| --- | --- | --- |
| 0 | 505 | 2.75 |
| 1 | 446 | 1.90 |
| 2 | 409 | 1.48 |
| 3 | 395 | 1.45 |
| 4 | 405 | 1.43 |

This data shows that after the third hour of operation an equilibrium is obtained and the pH and oxidation potential stay relatively constant.

*Example II*

A run was made using tertiary-dodecyl mercaptan as feed stock and toluene as the aromatic solvent, the method being essentially the same as that described in Example I. The temperature in the reactor was held at 130 to 140° F. The product, ditertiary dodecyl disulfide, was clear, light yellow in color, and had the following additional properties:

Density, g./cc. at 28° C_____ 0.9158
Refractive index, $n_D^{20}$_____ 1.5008
Total sulfur, weight per cent_____ 15.4
Mercaptan sulfur, weight per cent_____ 0.17

*Example III*

Ditertiary butyl disulfide was prepared by the same method used in the preceding examples using as a starting material tertiary butyl mercaptan and toluene as the aromatic solvent. The temperature in the reactor was held between 120 and 130° F. The properties of the product were:

Boiling range at 50 mm. pressure, °F___ 215–225
Density, g./cc. at 26° C_____ 0.8998
Refractive index, $n_D^{20}$_____ 1.4838
Total sulfur, weight per cent_____ 33.2

*Example IV*

This example shows that it is uneconomical to try to prepare dialkyl disulfides from low boiling mercaptans utilizing an aliphatic hydrocarbon solvent. Tertiary butyl mercaptan was used as the mercaptan feed and isooctane was used as the solvent. On attempting to oxidize the mercaptan to the corresponding disulfide, most of the intermediate product which was a cuprous mercaptide precipitated out as yellow crystals, thus, preventing the formation of the disulfide by the reaction of the mercaptide with the copper ion.

Our process for the manufacture of dialkyl disulfides from low molecular weight mercaptans is of great utility in that it provides a method which is rapid, economical, and easily followed; and wherein the cuprous mercaptide, ordinarily insoluble in aliphatic hydrocarbons, is kept in solution, thus allowing substantially complete conversion of the mercaptan charged to a dialkyl disulfide.

Although this process has been described and exemplified in terms of its preferred modifications, it is understood that various minor changes may be made without departing from the spirit and scope of the disclosure and of the claims.

We claim:

1. A process for the manufacture of dialkyl disulfides from low molecular weight mercaptans which comprises dissolving a mercaptan containing not more than 10 carbon atoms per molecule in an aromatic hydrocarbon selected from the group consisting of benzene and alkyl substituted benzenes, the resulting aromatic hydrocarbon solution exclusive of mercaptan containing at least 80 per cent aromatics and the volume ratio of said solution to mercaptan being in the range of 2:1 to 5:1; contacting at an elevated temperature the mercaptan-aromatic hydrocarbon solution with an oxidizing solution consisting essentially of an aqueous cupric copper ion solution in which the concentration of cupric copper is in the range of 3 to 14 mol per cent and the ratio of cupric copper ion solution to mercaptan-aromatic hydrocarbon solution is in the range of 1:1 to 10:1 so as to substantially completely oxidize said mercaptan to the corresponding dialkyl disulfide; continuously removing a minor portion of the thus formed dialkyl disulfide-aromatic hydrocarbon-cupric copper ion mixture to a separation zone and removing therefrom said aqueous cupric copper ion solution; regenerating said aqueous cupric copper ion solution by changing cuprous copper therein to cupric copper and recycling same to said contacting; recycling a major portion of said dialkyl disulfide-aromatic hydrocarbon; separating the remaining minor portion of said dialkyl disulfide-aromatic hydrocarbon; recycling separated aromatic hydrocarbon; and recovering said dialkyl disulfide as a product of the process.

2. A process according to claim 1 wherein said aromatic hydrocarbon is toluene.

3. A process according to claim 1 wherein regeneration of said cupric copper ion solution is effected by passing a stream of oxygen-containing gas therethrough.

4. A process for the manufacture of dialkyl disulfides from low molecular weight mercaptans which comprises treating an aromatic hydrocarbon solution in which the concentration of cupric copper is in the range of 3 to 14 mol per cent and the ratio of cupric copper ion solution to mercaptan in aromatic hydrocarbon mixture is in the range of 1:1 to 10:1 of a mercaptan with an oxidizing solution consisting essentially of an aqueous cupric copper ion solution, the aromatic hydrocarbon solution exclusive of mercaptan containing at least 80 per cent aromatics, the volume ratio of said solution to mercaptan being 2:1 to 5:1, said mercaptan containing not more than about 12 carbon atoms per molecule, and recovering the corresponding dialkyl disulfide from said treating.

5. A process for the manufacture of dialkyl disulfides from low molecular weight mercaptans, which comprises dissolving a mercaptan containing not more than 12 carbon atoms per molecule in an aromatic hydrocarbon of the single ring type, the aromatic hydrocarbon solution exclusive of mercaptan containing at least 80 per cent aromatics, the volume ratio of said solution to mercaptan being 2:1 to 5:1, contacting said mercaptan-aromatic hydrocarbon solution with a major portion of an oxidizing solution consisting essentially of an aqueous cupric copper ion solution in which the concentration of cupric copper is in the range of 3 to 14 mol per cent and the ratio of cupric copper ion solution to mercaptan in aromatic hydrocarbon mixture is in the range of 1:1 to 10:1 at an elevated temperature and substantially completely oxidizing said mercaptan to the corresponding dialkyl disulfide therewith, separating said aromatic hydrocarbon containing said dialkyl disulfide from said aqueous cupric copper ion solution, and recovering said dialkyl disulfide from said aromatic hydrocarbon as a product of the process.

6. A process for the manufacture of dialkyl disulfide from low molecular weight mercaptans, which comprises dissolving a mercaptan containing not more than 10 carbon atoms per molecule in an aromatic hydrocarbon selected from the group consisting of benzene and alkyl substituted benzenes in a volume ratio of mercaptan to aromatic hydrocarbon in the range of 1:2 to 1:5, the concentration of aromatic hydrocarbon exclusive of mercaptan being at least 80 per cent, contacting the thus formed mercaptan-aromatic hydrocarbon mixture with an oxidizing solution consisting essentially of an aqueous cupric copper ion solution in a volume ratio of cupric copper ion solution to mercaptan-aromatic hydrocarbon solution in the range of 1:1 to 10:1 and at a temperature in the range of 50 to 200° F., said cupric copper concentration being in the range of 3 to 14 mol per cent, substantially completely oxidizing said mercaptan to the corresponding dialkyl disulfide by means of said cupric copper ion solution; continuously removing a portion of the dialkyl disulfide-aromatic hydrocarbon-cupric copper ion mixture from said reaction zone to a separation zone wherein said aqueous cupric copper ion solution is removed therefrom, the aqueous cupric copper portion of said mixture removed from said reaction zone being in the range of about 50 to 200 volumes per volume of mercaptan-aromatic hydrocarbon introduced to said reaction zone, regenerating said aqueous cupric copper ion solution by passing an oxygen-containing gas therethrough, recycling said regenerated solution to said contacting, recycling a major portion of said dialkyl disulfide-aromatic hydrocarbon, separating the remaining minor portion of said dialkyl disulfide-aromatic hydrocarbon, recycling separated aromatic hydrocarbon, and recovering said dialkyl disulfide as a product of the process.

7. A process for the manufacture of dialkyl disulfides from low molecular weight mercaptans, which comprises dissolving a mercaptan containing not more than 10 carbon atoms per molecule in an aromatic hydrocarbon selected from the group consisting of benzene and alkyl substituted benzenes in a volume ratio of mercaptan to aromatic hydrocarbon in the range of 1:3 to 1:4, the concentration of aromatic hydrocarbon exclusive of mercaptan being at least 80 per cent, contacting the thus formed mercaptan-aromatic hydrocarbon mixture with an oxidizing solution consisting essentially of an aqueous cupric copper ion solution in a volume ratio of cupric copper ion solution to mercaptan-aromatic hydrocarbon solution in the range of 6:1 to 8:1 and at a temperature in the range of 70 to 140° F., said cupric copper concentration being in the range of 5 to 10 mol per cent, substantially completely oxidizing said mercaptan to the corresponding dialkyl disulfide by means of said cupric copper ion solution, continuously removing a portion of the dialkyl disulfide-aromatic hydrocarbon-cupric copper ion mixture from said reaction zone to a separation zone wherein said cupric copper ion solution is removed therefrom, the aqueous cupric copper portion of said mixture removed from said reaction zone being in the range of 50 to 200 volumes per volume of the mercaptan-aromatic hydrocarbon introduced to the reaction zone, regenerating said separated aqueous cupric copper ion solution by passing an oxygen-containing gas therethrough, recycling said regenerated cupric copper solution to said contacting, recycling a major portion of said dialkyl disulfide-aromatic hydrocarbon, separating the remaining minor portion of said dialkyl disulfide-aromatic hydrocarbon containing one volume of dialkyl disulfide per volume of mercaptan charged, separating and recycling aromatic hydrocarbon, and recovering said dialkyl disulfide as a product of the process.

8. A process according to claim 7 wherein the oxidation potential within the reaction zone is maintained between 375 and 500 millivolts as measured against saturated calomel.

9. A process according to claim 7 wherein said cupric copper ion solution comprises an aqueous solution of cupric copper ion in the presence of a chloride ion concentration equivalent to that of a 10 to 20 mol per cent sodium chloride solution.

10. A process for the manufacture of ditertiary butyl disulfide which comprises dissolving tertiary butyl mercaptan in toluene in a volume ration of 1:3 to 1:4 respectively, the concentration of toluene in the resulting solution exclusive of mercaptan being at least 80 per cent, contacting the thus formed hydrocarbon mixture with an oxidizing solution consisting essentially of an aqueous cupric copper ion solution in a volume ratio of cupric copper ion solution to mercaptan-aromatic hydrocarbon mixture in the range of 6:1 to 8:1 and at a temperature in the range of 70 to 140° F., said cupric copper concentration being in the range of 5 to 10 mol per cent, substantially completely oxidizing said mercaptan to the corresponding dialkyl disulfide by means of said cupric copper ion solution, continuously removing a portion of the ditertiary butyl disulfide-toluene-cupric copper ion mixture from said reaction zone to a separation zone, the aqueous cupric copper portion of said mixture removed from said reaction zone being in the range of 20 to 30 volumes per volume of the teritary butyl mercaptan and toluene introduced to the reaction zone, separating the ditertiary butyl disulfide-toluene mixture from said aqueous cupric copper ion solution, regenerating said separated aqueous cupric copper ion solution by passing an oxygen-containing gas therethrough, recycling said regenerated cupric copper solution to said contacting, recycling a major portion of said ditertiary butyl disulfide-toluene mixture, separating the remaining minor portion of said ditertiary butyl disulfide-toluene mixture containing one volume of ditertiary butyl disulfide per volume of mercaptan charged, separating and recycling toluene, and recovering said ditertiary butyl disulfide as a product of the process.

WALTER A. SCHULZE.
WILLIE W. CROUCH.

References Cited in the file of this patent

UNITED STATES PATENTS

| Number | Name | Date |
|---|---|---|
| 2,378,092 | Messmore et al. | June 12, 1945 |
| 2,415,851 | Schulze et al. | Feb. 18, 1947 |
| 2,421,545 | Crouch | June 3, 1947 |
| 2,503,644 | Warner et al. | Apr. 11, 1950 |

FOREIGN PATENTS

| Number | Country | Date |
|---|---|---|
| 435,113 | Great Britain | Sept. 16, 1935 |

OTHER REFERENCES

Birch et al., Ind. Eng. Co., vol. 28, No. 6, June 1936, page 668.

Slagle et al., ibid., vol. 24, No. 4, pages 448–451.